United States Patent
Braun

(10) Patent No.: US 10,839,857 B1
(45) Date of Patent: Nov. 17, 2020

(54) PROCESS FOR MAKING A MUSIC VIDEO

(71) Applicant: Erich Daniel Braun, Aurora, CO (US)

(72) Inventor: Erich Daniel Braun, Aurora, CO (US)

( * ) Notice: Subject to any disclaimer, the term of this patent is extended or adjusted under 35 U.S.C. 154(b) by 0 days.

(21) Appl. No.: 16/299,870

(22) Filed: Mar. 12, 2019

Related U.S. Application Data

(60) Provisional application No. 62/655,082, filed on Apr. 9, 2018.

(51) Int. Cl.
| | |
|---|---|
| *G11B 27/036* | (2006.01) |
| *H04N 5/77* | (2006.01) |
| *G09B 19/00* | (2006.01) |
| *H04N 9/87* | (2006.01) |
| *G09B 5/06* | (2006.01) |
| *H04N 9/802* | (2006.01) |

(52) U.S. Cl.
CPC ............ *G11B 27/036* (2013.01); *G09B 5/065* (2013.01); *G09B 19/00* (2013.01); *H04N 5/77* (2013.01); *H04N 9/802* (2013.01); *H04N 9/8715* (2013.01)

(58) Field of Classification Search
CPC ...... G11B 27/036; G09B 5/065; G09B 19/00; H04N 5/77; H04N 9/802; H04N 9/8715
USPC ...................................................... 386/285
See application file for complete search history.

(56) References Cited

U.S. PATENT DOCUMENTS

| | | | | |
|---|---|---|---|---|
| 5,586,967 | A * | 12/1996 | Davis | A61M 21/00 600/28 |
| 2003/0036042 | A1* | 2/2003 | Hill | G09B 23/28 434/236 |
| 2004/0090211 | A1* | 5/2004 | Gupta | F01D 15/10 322/10 |
| 2007/0201815 | A1* | 8/2007 | Griffin | G11B 27/034 386/231 |
| 2008/0247726 | A1* | 10/2008 | Lee | G11B 27/036 386/282 |
| 2014/0152828 | A1* | 6/2014 | Plante | B60R 16/03 348/148 |
| 2015/0318020 | A1* | 11/2015 | Pribula | H04N 21/43615 386/227 |

* cited by examiner

*Primary Examiner* — Thai Q Tran
*Assistant Examiner* — Nienru Yang
(74) *Attorney, Agent, or Firm* — Plager Schack LLP; Mark H. Plager; Michael J. O'Brien

(57) ABSTRACT

A process for making a safety video in order to keep a video watcher engaged involves the following steps. First, filming a safety parody video of things typical to a life of the road worker made into rap songs. Then, removing sound created by equipment in the safety parody video. After that, adding rap music about the contents of the safety parody video while producing a mild hypnotic subliminal effect. Following that, transmitting a suggestion of working hard while working well to obtain rewards. Finally, warning users against the consequences of malfeasance. A combination of positive and negative subliminal messages in a parody video effectively engages the video watcher into learning about workplace safety.

7 Claims, 2 Drawing Sheets

PROCESS FOR MAKING A MUSIC VIDEO

RELATED APPLICATION

This application claims priority to provisional patent application U.S. Ser. No. 62/655,082 filed on Apr. 9, 2018, the entire contents of which is herein incorporated by reference.

BACKGROUND

The embodiments herein relate generally to filmography. Prior to embodiments of the disclosed invention safety videos were boring and information provided was unclear and hard to comprehend. Embodiments of the disclosed invention solve this problem.

SUMMARY

A process for making a safety video in order to keep a video watcher engaged involves the following steps. First, filming a safety parody video of things typical to a life of the road worker made into rap songs. Then, removing sound created by equipment in the safety parody video. After that, adding rap music about the contents of the safety parody video while producing a mild hypnotic subliminal effect. Following that, transmitting a suggestion of working hard while working well to obtain rewards. Finally, warning users against the consequences of malfeasance. A combination of positive and negative subliminal messages in a parody video effectively engages the video watcher into learning about workplace safety.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

The process for making a safety video 10 includes involves the following steps. First, at step 12, filming a safety parody video of things typical to an everyday life of the road worker made into rap songs. Then, at step 14, removing sound created by equipment in the safety parody video. After that, at step 16, adding rap music about the contents of the safety parody video while producing a mild hypnotic subliminal effect. Following that, at step 18, transmitting a suggestion of working hard while working well to obtain rewards. Finally, at step 20, warning users against the consequences of malfeasance. A combination of positive and negative subliminal messages in a parody video effectively engages the video watcher into learning about workplace safety.

Figure 1:
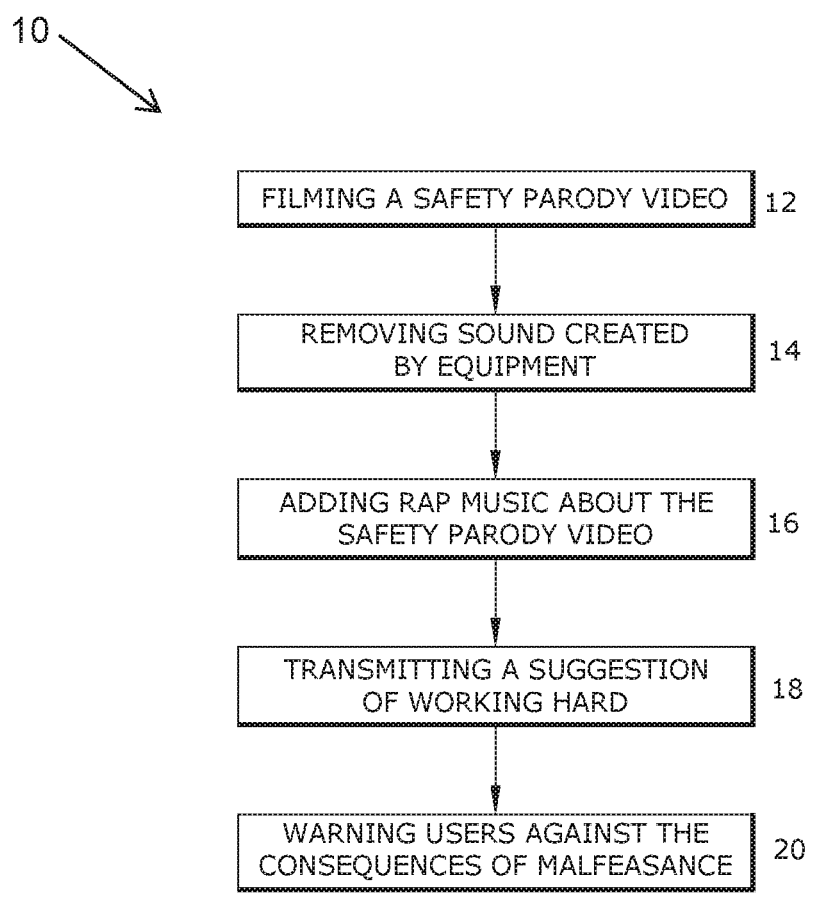
FIG. 1 shows a schematic flow diagram of an embodiment of the invention.
Figure 2:
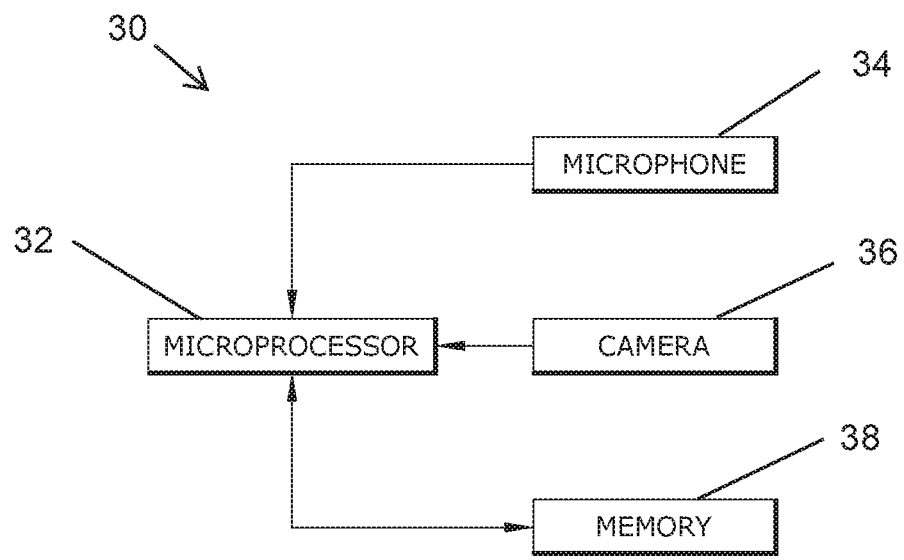
FIG. 2 shows a schematic flow diagram of an embodiment of the invention.

Turning to FIG. 2, a system 30, can be used to implement this process. The system includes a microprocessor 32 receiving an audio input from a microphone 34, and a video input from a camera 36. The microprocessor 32 can store and retrieve information from a memory 38. In some embodiments, the microprocessor 32 receives the input from both the camera and the microphone, process the information and stores the safety video into the memory.

In some embodiments, this system can include a generator further comprising a hydraulic rotor arranged within a stator. The rotor is mechanically coupled to a turbine. Engaging the turbine turns the rotor which, in turn, creates electric power. The embodiment describe here also has a battery coupled to an inverter which is connected covers AC power from the turbine to DC power that can be used by the rest of the system.

In some embodiments, a 12-volt solar hybrid electrical system it utilizes the power from the panels or the power from an alternator to power the equipment. Redundant switching systems can allow the truck studio to run. Whereas, manual switches can be used however one must remember to flip the switches.

In some embodiments, the process for making safety videos can be housed in recreational vehicles. In some embodiments, a 12-volt solar hybrid electrical system it utilizes the power from the panels or the power from an alternator to power the equipment. Redundant switching systems can allow the truck studio to run or manual switches can be used however one must remember to flip the switches.

The video can begin with something set on fire. Next, a person is thrown from a truck. Finally, flip two semitrucks that were carelessly overloaded. A video camera, dash cameras, and video editing software such as Wonder share and Sony picture studio, and DVD maker can be used to make the video. Music creation hardware and software such as a midi key station and file creation software such as Cakewalk in order to add and remove sound as desired. Other equipment can include: semi-trucks, two crash trucks, a sign board truck, a mechanic's truck, a producer's truck made out of class a or c recreation vehicle, a shop yard, a street sweeper, an epoxy applicator, and other striping applicators.

Optional special effects can include computer graphic simulations, animation, road paving equipment and crews, new road painting equipment that hasn't been invented, and other construction crews and equipment such as building construction or that hasn't been invented or listed here, could all be added to make my products better. Virtually anything that can be imagined can be added.

Figure 3:
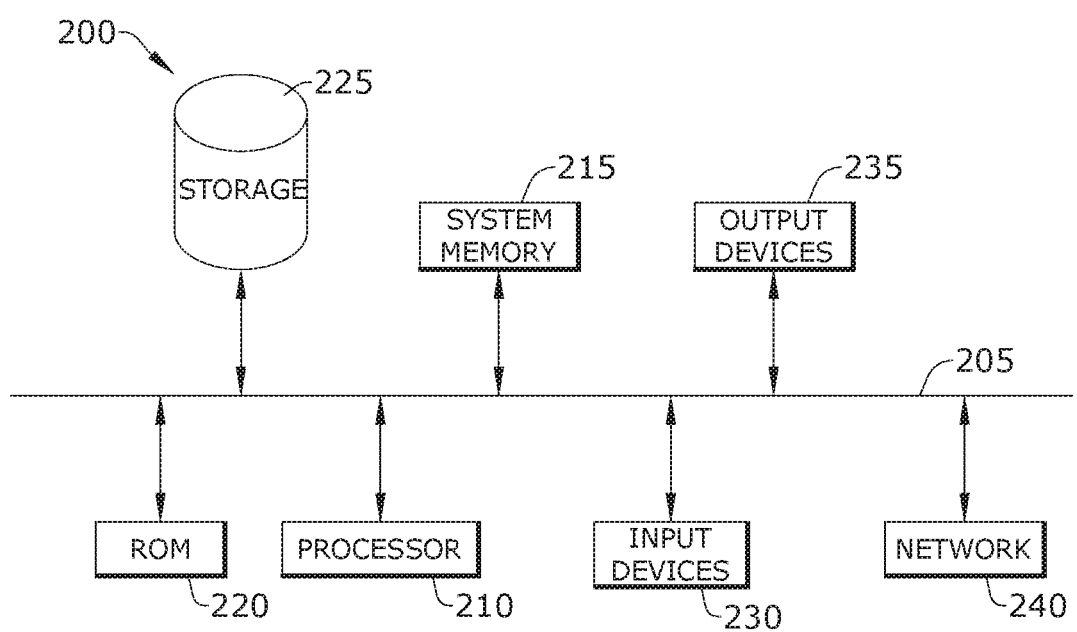
FIG. 3 shows a schematic flow diagram of an embodiment of the invention.

FIG. 3 conceptually illustrates an electronic system 200 with which some embodiments of the invention are implemented. The electronic system 200 may be a computer, phone, PDA, or any other sort of electronic device. Such an electronic system includes various types of computer readable media and interfaces for various other types of computer readable media. Electronic system 200 includes a bus 205, processing unit(s) 210, a system memory 215, a read-only 220, a permanent storage device 225, input devices 230, output devices 235, and a network 240.

The bus 205 collectively represents all system, peripheral, and chipset buses that communicatively connect the numerous internal devices of the electronic system 200. For instance, the bus 205 communicatively connects the processing unit(s) 210 with the read-only 220, the system memory 215, and the permanent storage device 225.

From these various memory units, the processing unit(s) 210 retrieves instructions to execute and data to process in order to execute the processes of the invention. The processing unit(s) may be a single processor or a multi-core processor in different embodiments.

The read-only-memory (ROM) 220 stores static data and instructions that are needed by the processing unit(s) 210 and other modules of the electronic system. The permanent storage device 225, on the other hand, is a read-and-write memory device. This device is a non-volatile memory unit that stores instructions and data even when the electronic system 200 is off. Some embodiments of the invention use a mass-storage device (such as a magnetic or optical disk and its corresponding disk drive) as the permanent storage device 225.

Other embodiments use a removable storage device (such as a floppy disk or a flash drive) as the permanent storage device 225. Like the permanent storage device 225, the system memory 215 is a read-and-write memory device. However, unlike storage device 225, the system memory 215 is a volatile read-and-write memory, such as a random access memory. The system memory 215 stores some of the instructions and data that the processor needs at runtime. In some embodiments, the invention's processes are stored in the system memory 215, the permanent storage device 225, and/or the read-only 220. For example, the various memory units include instructions for processing appearance alterations of displayable characters in accordance with some embodiments. From these various memory units, the processing unit(s) 210 retrieves instructions to execute and data to process in order to execute the processes of some embodiments.

The bus 205 also connects to the input and output devices 230 and 235. The input devices enable the person to communicate information and select commands to the electronic system. The input devices 230 include alphanumeric keyboards and pointing devices (also called "cursor control devices"). The output devices 235 display images generated by the electronic system 200. The output devices 235 include printers and display devices, such as cathode ray tubes (CRT) or liquid crystal displays (LCD). Some embodiments include devices such as a touchscreen that functions as both input and output devices.

Finally, as shown in FIG. 3, bus 205 also couples electronic system 200 to a network 240 through a network adapter (not shown). In this manner, the computer can be a part of a network of computers (such as a local area network ("LAN"), a wide area network ("WAN"), or an intranet), or a network of networks (such as the Internet). Any or all components of electronic system 200 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

Adding computer graphics, animation and special effects, can give a more dramatic experience. This adds to the effect in the viewer's mind increasing the imprint on any viewer's mind. This can be embedded before or after any element in the presentation. you can eliminate or add elements, such as special effects, animation, computer graphic, simulations, and new sound effects, instrument sounds form instruments or programming software, video editing, and animation or computer graphic software. Combinations of these elements increase the invention's ability to bypass the conscious mind in order to create the subconscious behavior.

What is claimed is:

1. A computer implemented process for making a safety parody video in order to actively engage a video watcher into learning about workplace safety using a computer having a microprocessor; the process comprising:
   filming the safety parody video, with the microprocessor, covering events typical to the life of the road worker with a camera; and storing the safety parody video in memory;
   arranging an electrical power source in a recreational vehicle wherein the electrical power source further comprises: a generator further comprising a hydraulic rotor arranged within a stator; and a turbine, mechanically coupled to the rotor; wherein engaging the turbine turn the rotor which creates electric power;
   electrically coupling the electrical power source to the microprocessor, a microphone, and the camera;
   removing background sound created by equipment in the safety parody video with the microprocessor; creating a first edited safety parody video with the microprocessor; storing the first edited safety parody video in the memory;
   adding rap music with the microphone about contents of the first edited safety parody video while producing a mild hypnotic subliminal effect; storing the rap music in the memory with the microprocessor; creating a second edited safety parody video;
   storing the second edited safety parody video in the memory;
   transmitting, through the microprocessor, in the second edited safety parody video transmits a suggestion of working hard while working well to obtain rewards with a positive subliminal message; and
   transmitting, through the microprocessor, in the second edited safety parody video the consequences of malfeasance in order to actively engage the video watcher into learning about workplace safety with a negative subliminal message.

2. The computer implemented process for making a safety parody video of claim 1, wherein the microphone, the memory and the camera are communicatively coupled to the microprocessor.

3. The computer implemented process for making a safety parody video of claim 2, wherein the microprocessor receives data from both the camera and the microphone.

4. The computer implemented process for making a safety parody video of claim 3, wherein the microprocessor processes the data and stores the second edited safety parody video in the memory.

5. The computer implemented process for making safety parody video in claim 4, wherein an electrical power source is electrically coupled to the microprocessor, the microphone, and the camera.

6. The computer implemented process for making safety parody video in claim 5, wherein the electrical power source further comprises: an inverter, electrically coupled to the turbine, and further electrically coupled to a battery.

7. The computer implemented process for making safety parody video in claim 6, wherein the electrical power source further comprises a 12-volt solar hybrid electrical system electrically coupled to the inverter.

\* \* \* \* \*